United States Patent

Buckley et al.

[11] Patent Number: 6,037,291
[45] Date of Patent: Mar. 14, 2000

[54] REGENERATION OF ADSORBERS UTILIZING THERMAL OXIDATION OF ADSORBATES

[75] Inventors: Wayne P. Buckley, Stanhope, N.J.; Boris Altshuler, Brooklyn, N.Y.

[73] Assignee: Croll Reynolds Clean Air Technologies, Inc., Westfield, N.J.

[21] Appl. No.: 09/065,248

[22] Filed: Apr. 23, 1998

[51] Int. Cl.[7] ................................................. B01J 20/34
[52] U.S. Cl. ........................ 502/55; 422/171; 422/173; 422/178; 95/115
[58] Field of Search ................... 62/6, 115; 422/169, 422/171, 173, 178, 280, 281, 285, 244; 95/115; 502/55

[56] References Cited

U.S. PATENT DOCUMENTS

| | | | |
|---|---|---|---|
| 1,836,301 | 12/1931 | Bechthold | 96/144 |
| 2,692,656 | 10/1954 | Berg | 95/112 |
| 3,436,839 | 4/1969 | Ellington | 34/80 |
| 4,589,890 | 5/1986 | Gronvaldt | 502/55 |
| 4,829,036 | 5/1989 | Nelson et al. | 502/50 |
| 5,230,872 | 7/1993 | Tiggelbeck et al. | 422/261 |
| 5,292,695 | 3/1994 | Galloway | 502/53 |
| 5,759,236 | 6/1998 | Bruck et al. | 95/41 |
| 5,779,768 | 7/1998 | Anand et al. | 95/99 |

OTHER PUBLICATIONS

"Adsorption with Activated Carbon," *Chemical Processing*, Nov. 1997.

*Primary Examiner*—Thomas Dunn
*Attorney, Agent, or Firm*—Arthur Jacob

[57] ABSTRACT

An improvement in the operation of a thermal oxidizer during regeneration of an adsorber, wherein adsorbates collected in the adsorber are removed from the adsorber and introduced into the thermal oxidizer, by regenerative steam passed through the adsorber, to be oxidized in the thermal oxidizer during a regenerative cycle of prescribed duration, regulates the concentration of adsorbates in the regenerative steam passed to the thermal oxidizer such that the concentration of adsorbates introduced into the thermal oxidizer throughout the duration of the regenerative cycle is regulated to avoid excessive deviations from a selected average concentration of adsorbates, the regulated concentration of adsorbates enabling more efficient operation of the thermal oxidizer throughout the full duration of the regenerative cycle.

20 Claims, 6 Drawing Sheets

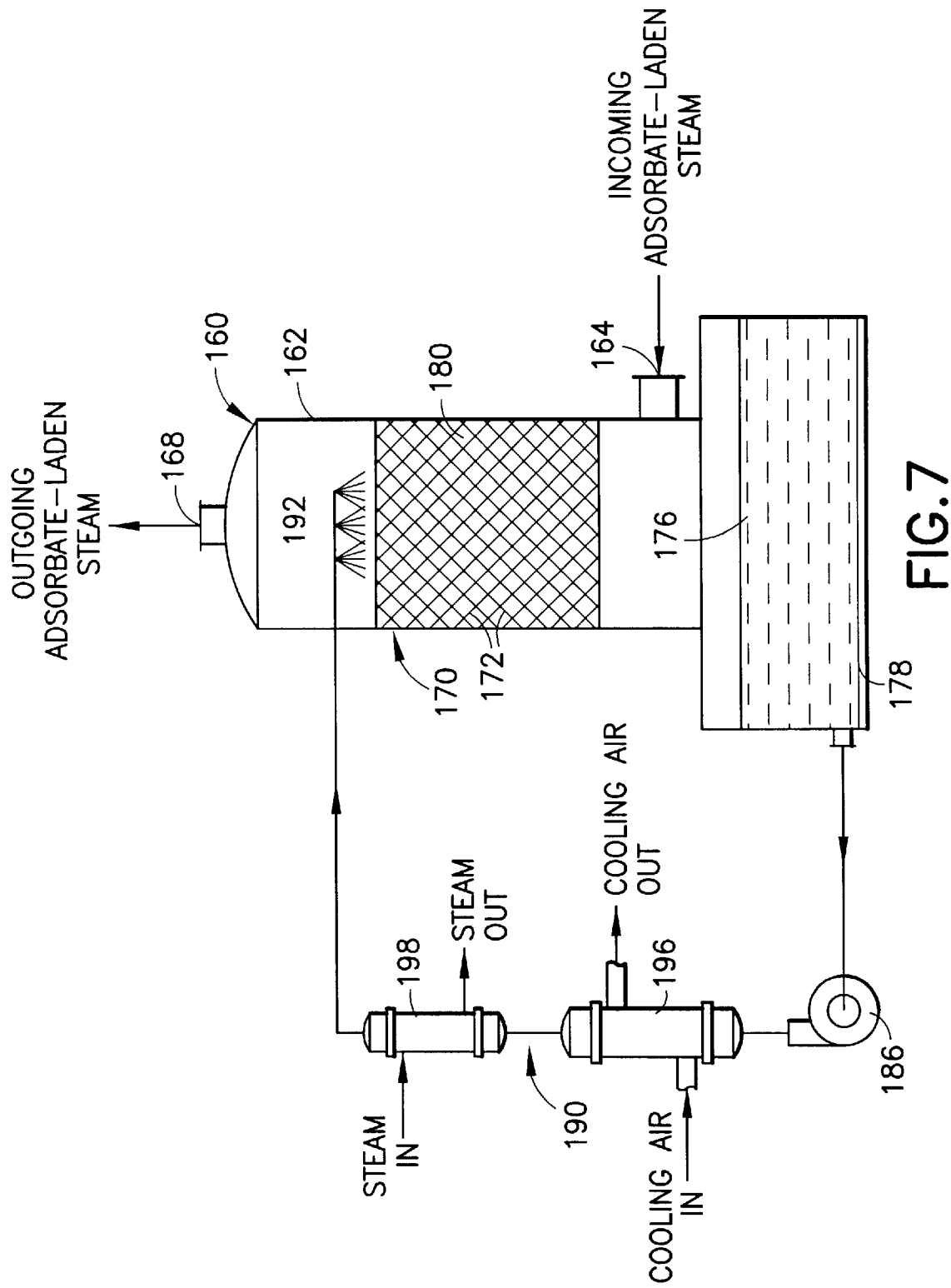

REGENERATION OF ADSORBERS UTILIZING THERMAL OXIDATION OF ADSORBATES

The present invention relates generally to the removal of contaminants from industrial and commercial exhaust gas streams and pertains, more specifically, to the control of emissions of organic compounds by utilizing adsorption techniques to collect volatile organic compounds and periodic thermal oxidation to destroy the collected adsorbates.

One of the most effective and economical methods for controlling emissions of volatile organic compounds (VOC) emanating from industrial and commercial sources is adsorption, utilizing activated carbon as an adsorption medium. Even low concentrations of VOC readily are removed from exhaust streams when passed through a bed of activated carbon in an adsorber. Most activated carbon adsorption systems have at least two adsorption beds to allow for continuous flow of exhaust gases through the system. The adsorbers are cycled in and out of service, so that each adsorber operates essentially in a batch mode, while the overall operation of the system essentially is continuous. The modes are characterized by an adsorption cycle and a desorption, or regeneration cycle.

In the adsorption cycle, the VOC-laden gas stream is passed through a first adsorber, which contains a freshly regenerated carbon bed. The VOC are adsorbed onto the surface of the carbon until the adsorbate concentration reaches a predetermined maximum level, and then the flow of contaminated gas is transferred to a second adsorber to be exposed to a second carbon bed. While the second adsorber is in service, the carbon bed of the first adsorber is regenerated to be made ready for a new adsorption cycle when the carbon bed of the second adsorber reaches the maximum level of concentration of adsorbate. The cycling between the first and second adsorbers permits uninterrupted treatment of the exhaust gas from a continuous process.

Regeneration and reconditioning of the carbon bed of an adsorber is accomplished through thermal desorption. The most common heat source for thermal desorption of the carbon bed is low-pressure steam which ordinarily is introduced countercurrently to the exhaust gas flow. The temperature of the desorbing, or regenerative steam is made higher than the boiling point of the organic compound having the highest boiling point in the VOC so as to drive off essentially all of the voc from the surface of the carbon bed during the regeneration cycle.

Destruction of the VOC driven from the adsorber during the regeneration cycle is best accomplished in a thermal oxidizer. While ordinarily thermal oxidation is a costly disposal method for treating the lower concentrations of VOC contained in process exhaust gases, the collection of VOC over the longer period provided by the carbon adsorption process enables the regenerative steam to carry higher concentrations of VOC to a thermal oxidizer. The high concentration of VOC in the regenerative steam, combined with the relatively short duration of the desorption, or regeneration cycle, enables economical destruction of the VOC in the thermal oxidizer. A properly designed thermal oxidizer is able to utilize the calorific value of the desorbed VOC to generate temperatures required for destruction of the VOC with minimal auxiliary fuel consumption.

It has been found that, in a typical carbon bed adsorber regeneration cycle utilizing regenerative steam, more than ninety-five percent of the total adsorbed VOC is desorbed from the carbon bed during the first half of the duration of the full regeneration cycle, with the remaining VOC being desorbed during the second half of the duration of the regeneration cycle. It has been observed that the concentration of VOC in the regenerative steam rises rapidly to a peak level and remains at that peak level during only a relatively short period within the first half of the regeneration cycle, and then gradually decreases over the remainder of the duration of the regeneration cycle until essentially all of the VOC are desorbed. The peak concentration of VOC is almost four times as great as the average concentration of VOC over the duration of the regeneration cycle. As a result of the early peak concentration characteristics of the regeneration cycle, the design of an economical thermal oxidizer becomes somewhat problematic. Thus, a thermal oxidizer designed to accommodate the peak concentration is excessively large and uneconomical in operation over the full duration of the regeneration cycle, while a thermal oxidizer which operates economically to accommodate the average concentration is inadequate to handle the peak concentration.

The present invention overcomes the problem presented by the above-described peak concentration characteristics of a carbon bed adsorber regeneration cycle and enables economical operation of a thermal oxidizer in accommodating the destruction of VOC during the regeneration cycle. As such, the present invention attains several objects and advantages, some of which are summarized as follows: Enables a thermal oxidizer to accomplish economical destruction of adsorbates during the regeneration cycle of a carbon bed adsorber by regulating the concentration of adsorbates passed to the thermal oxidizer so as to avoid excessive deviations from an average concentration and thereby avoid the necessity for accommodating peak concentrations; permits essentially continuous economical operation of a thermal oxidizer having a capacity for accommodating an average concentration of adsorbates passed to the thermal oxidizer during a regeneration cycle, requiring minimal auxiliary fuel, as opposed to requiring a higher capacity thermal oxidizer for accommodating excessively high peak concentrations; provides increased economy in the collection and destruction of contaminants in exhaust gases emanating from industrial and commercial processes; enhances the ability of carbon bed adsorbers to be used economically for the collection and destruction of VOC in process gas streams; provides reliable and continuous removal and destruction of contaminants, such as VOC, from process exhaust gases over a relatively long service life.

The above objects and advantages, as well as further objects and advantages, are attained by the present invention which may be described briefly as apparatus for improving the operation of a thermal oxidizer during regeneration of an adsorber, wherein adsorbates collected in the adsorber are removed from the adsorber and introduced into the thermal oxidizer, by regenerative steam passed through the adsorber, to be oxidized in the thermal oxidizer during a regenerative cycle of prescribed duration, the apparatus comprising: a chamber for interposition between the adsorber and the thermal oxidizer, the chamber including an inlet for receiving incoming adsorbate-laden steam from the adsorber, and an outlet for passing outgoing adsorbate-laden steam to the thermal oxidizer; a condenser in the chamber between the inlet and the outlet for condensing a portion of the incoming adsorbate-laden steam during at least an initial period of the regenerative cycle to form an adsorbate-laden condensate, thereby reducing the concentration of adsorbates in the outgoing adsorbate-laden steam during at least the initial period of the regenerative cycle; and an evaporator for evaporating the adsorbate-laden condensate to form an it adsorbate-laden stream for introduction into the thermal oxidizer during a subsequent period of the regenerative cycle; whereby the concentration of adsorbates introduced into the thermal oxidizer throughout the duration of the regenerative cycle is regulated to avoid excessive deviations from a selected average concentration of adsorbates, the regulated concentration of adsorbates enabling more efficient operation of the thermal oxidizer throughout the full duration of the regenerative cycle.

In addition, the present invention pertains to a method for improving the operation of a thermal oxidizer during regeneration of an adsorber, wherein adsorbates collected in the adsorber are removed from the adsorber and introduced into the thermal oxidizer, by regenerative steam passed through the adsorber, to be oxidized in the thermal oxidizer during a regenerative cycle of prescribed duration, the method comprising: providing a chamber for interposition between the adsorber and the thermal oxidizer; receiving within the chamber incoming adsorbate-laden steam from the adsorber and passing outgoing adsorbate-laden steam to the thermal oxidizer; condensing a portion of the incoming adsorbate-laden steam during at least an initial period of the regenerative cycle to form an adsorbate-laden condensate, thereby reducing the concentration of adsorbates in the outgoing adsorbate-laden steam during at least the initial period of the regenerative cycle; and evaporating the adsorbate-laden condensate to form an adsorbate-laden stream for introduction into the thermal oxidizer during a subsequent period of the regenerative cycle; whereby the concentration of adsorbates introduced into the thermal oxidizer throughout the duration of the regenerative cycle is regulated to avoid excessive deviations from a selected average concentration of adsorbates, the regulated concentration of adsorbates enabling more efficient operation of the thermal oxidizer throughout the full duration of the regenerative cycle.

The invention will be understood more fully, while still further objects and advantages will become apparent, in the following detailed description of preferred embodiments of the invention illustrated in the accompanying drawing, in which:

FIG. 7 is a partially diagrammatic illustration of another alternate arrangement for use in the improved system of FIG. 3.

Figure 1:
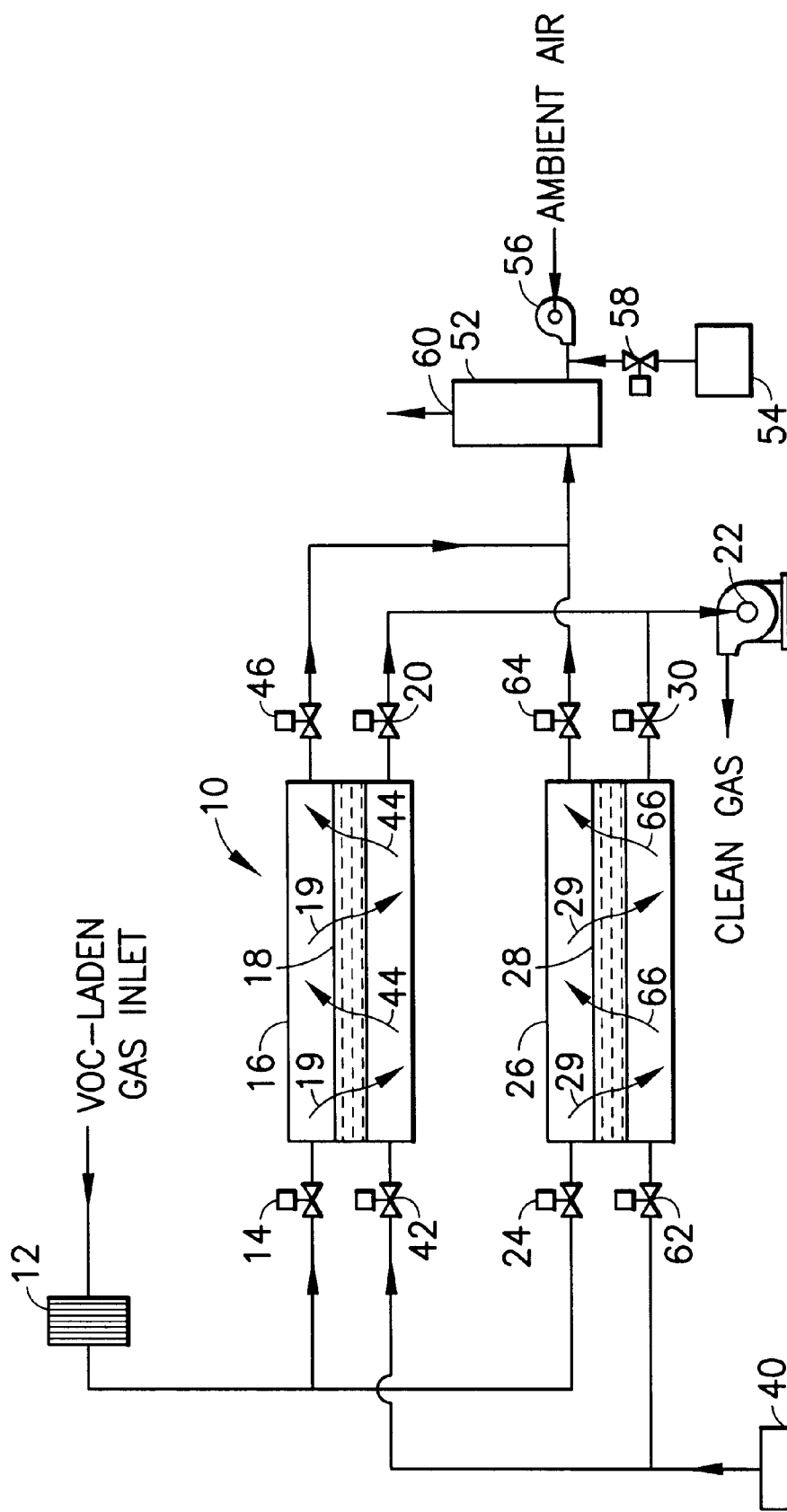
FIG. 1 is a diagrammatic illustration of a typical carbon adsorption, thermal oxidation system known in the prior art.

Referring now to the drawing, and especially to FIG. 1 thereof, a currently known system in which contaminants in the form of volatile organic compounds (VOC) are removed from an exhaust gas stream during an adsorption cycle in a carbon bed adsorber and are destroyed in a thermal oxidizer during a desorption, or regenerating cycle is illustrated diagrammatically at 10. An exhaust gas stream contaminated with VOC is passed through a particulate filter 12 and is directed through a first inlet valve 14 to a first adsorber 16 where the VOC are adsorbed by a bed 18 of activated carbon. During this adsorption cycle, the VOC-laden gas is passed through the bed 18, in the direction of arrows 19, and the cleaned gas is passed out of the adsorber 16 to be exhausted from the system 10, through a first outlet valve 20, assisted by a fan 22, in an essentially continuous process. When the bed 18 of the first adsorber 16 becomes saturated, completing the adsorption cycle in the first adsorber 16, valves 14 and 20 are closed and the exhaust gas stream entering system 10 through particulate filter 12 is directed through a second inlet valve 24 to a second adsorber 26 where the VOC are adsorbed by a bed 28 of activated carbon as the VOC-laden gas is passed through the bed 28 in the direction of arrows 29, during an adsorption cycle carried out in the second adsorber 26. As described above, the cleaned gas is passed out of the adsorber 26 and is exhausted, through a second outlet valve 30, assisted by fan 22, in an essentially continuous process.

While the second adsorber 26 is operated through the adsorption cycle, the first adsorber 16 is operated through a desorption, or regeneration cycle. During the regeneration cycle, is regenerative steam from a source 40 of steam is directed, through a first steam inlet valve 42, into the first adsorber 16 and is passed through the bed 18 in the direction of arrows 44, counter to the direction depicted by arrows 19. The temperature of the steam is higher than the boiling point of the organic compound having the highest boiling point in the VOC so as to drive off essentially all of the VOC from the bed 18 during the regeneration cycle. The VOC-laden steam is passed out of the adsorber 16, through a steam outlet valve 46, and is directed to a thermal oxidizer 52, where the VOC are destroyed. The thermal oxidizer 52 is heated, at least initially, by fuel from a fuel source 54, and ambient air is provided by an ambient air blower 56. A fuel valve 58 is utilized to modulate the flow of fuel when the thermal oxidizer 52 is heated sufficiently by the oxidation of the VOC themselves. Exhaust gases, essentially free of VOC, exit the thermal oxidizer 52 at 60.

When the regeneration cycle in first adsorber 16 is complete, steam valves 42 and 46 are closed and first adsorber 16 is ready for placement back into service for another adsorption cycle. Upon completion of the adsorption cycle in second adsorber 26, valves 24 and 30 are closed and steam valves 62 and 64 are opened to pass regenerative steam into second adsorber 26 where the steam is passed through bed 28, in the direction of arrows 66, to drive VOC from the bed 28. As before, the VOC-laden steam is passed into the thermal oxidizer 52 where the VOC are destroyed. While the regeneration cycle is conducted in the second adsorber 26, the first adsorber 16 is operated through another adsorption cycle. In this manner, system 10 effects an essentially uninterrupted process for removal and destruction of VOC from the exhaust gas passed continuously through the system 10.

Experience has shown that more than ninety-five percent of the total adsorbed VOC is desorbed from the bed of a carbon bed adsorber during the first half of the duration of the full regeneration cycle, with the remaining VOC being desorbed during the second half of the duration of the regeneration cycle. It has been observed that the concentration of VOC in the regenerative steam leaving the carbon bed rises rapidly to a peak level and remains at that peak level during only a relatively short period within the first half of the regeneration cycle, and then gradually decreases over the remainder of the duration of the regeneration cycle until essentially all of the VOC are desorbed.

Figure 2:
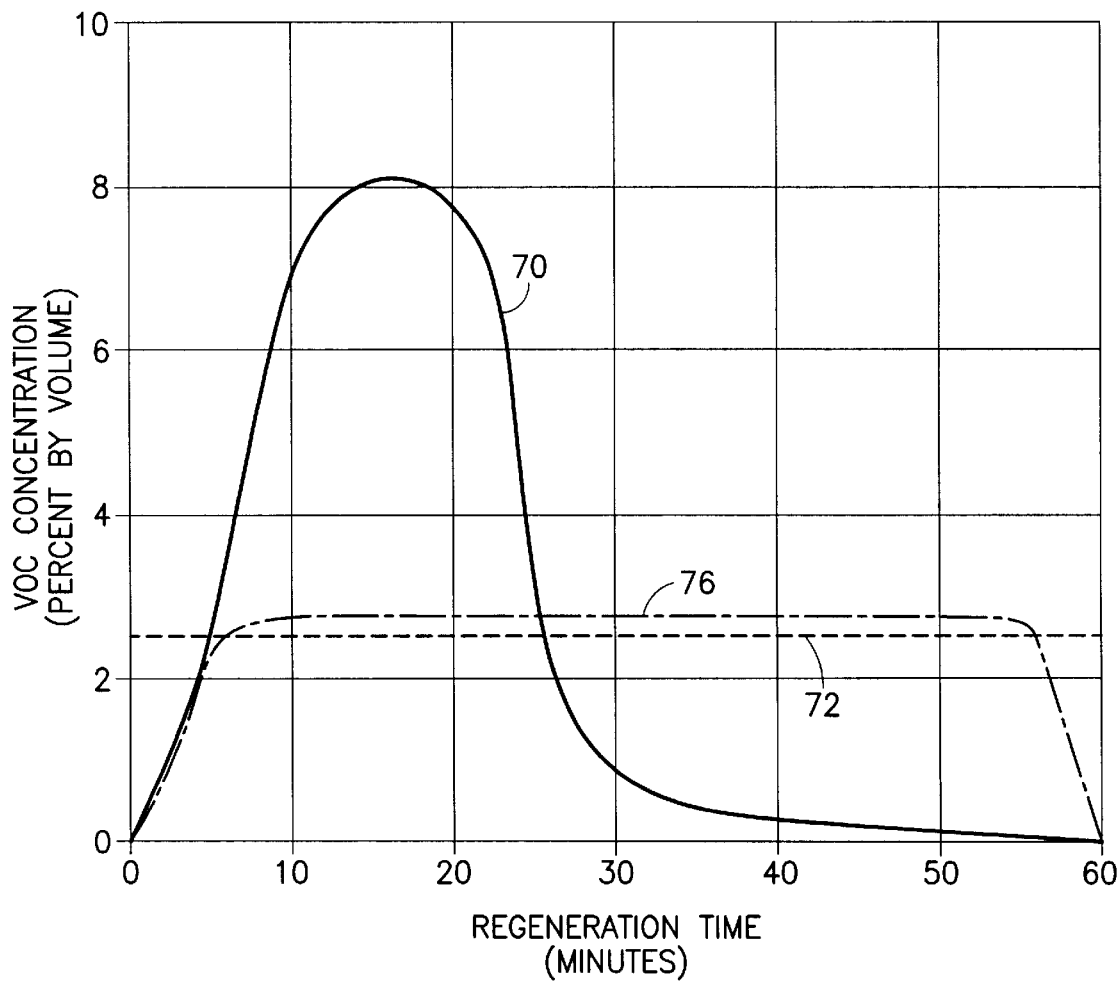
FIG. 2 is a graph depicting the operation of a carbon bed adsorber regeneration cycle.

Turning now to FIG. 2, the concentration of VOC in the regenerative steam passed from adsorber 16, 26 to thermal oxidizer 52, during a regeneration cycle having a duration of sixty minutes is shown by a curve 70. During the first ten minutes of the regeneration cycle, the concentration of VOC in the regenerative steam leaving the adsorber 16, 26 rises rapidly to a peak of about eight percent by volume and remains at that level of concentration for approximately ten minutes before declining rapidly over the next ten minutes. The concentration then gradually decreases over the remainder of the sixty-minute regeneration cycle until essentially all of the VOC have been desorbed and the level of VOC in the stream of regenerative steam falls below a detectable limit. Accordingly, more than ninety-five percent of the VOC is desorbed from the bed 18, 28 during the first thirty minutes of the regeneration cycle, with the remainder of the VOC being desorbed during the last thirty minutes of the regeneration cycle. The average concentration of VOC in the regenerative steam leaving the adsorber 16, 26 over the full sixty-minute duration of the regeneration cycle, as shown by the level 72, is about two and one-half percent.

In order to accommodate a peak concentration of eight percent by volume VOC in the regenerative steam passed to the thermal oxidizer 52, while providing the thermal oxidizer 52 with the ability to destroy VOC efficiently at the upper level of about eight percent VOC and at the lower level of about two percent VOC, design calculations reveal that the volumetric size of the thermal oxidizer 52 must be made at least thirty percent greater than the volumetric size necessary to accommodate only the lower level of concentration of about two percent by volume of VOC. Recognizing that greater economy can be realized by requiring the thermal oxidizer 52 to accommodate only a level of VOC concentration which remains essentially at an average level throughout the regeneration cycle, the present invention provides apparatus and method for controlling the concentration of adsorbates in the regenerative steam passed to the thermal oxidizer so that the concentration of adsorbates introduced into the thermal oxidizer throughout the full duration of the regeneration cycle is regulated to avoid excessive deviations from a selected average concentration of adsorbates. The selected average concentration enables the design of a smaller, more efficient thermal oxidizer than otherwise would be required to handle excessively high peak concentrations combined with relatively low concentrations over the full duration of the regeneration cycle. Thus, as illustrated by the curve 76 in FIG. 2, by confining the concentration of VOC in the VOC-laden regenerative steam introduced into the thermal oxidizer essentially to an average concentration of about two percent by volume throughout the duration of the regeneration cycle, greater efficiency is attained in the design and operation of the thermal oxidizer.

Figure 3:
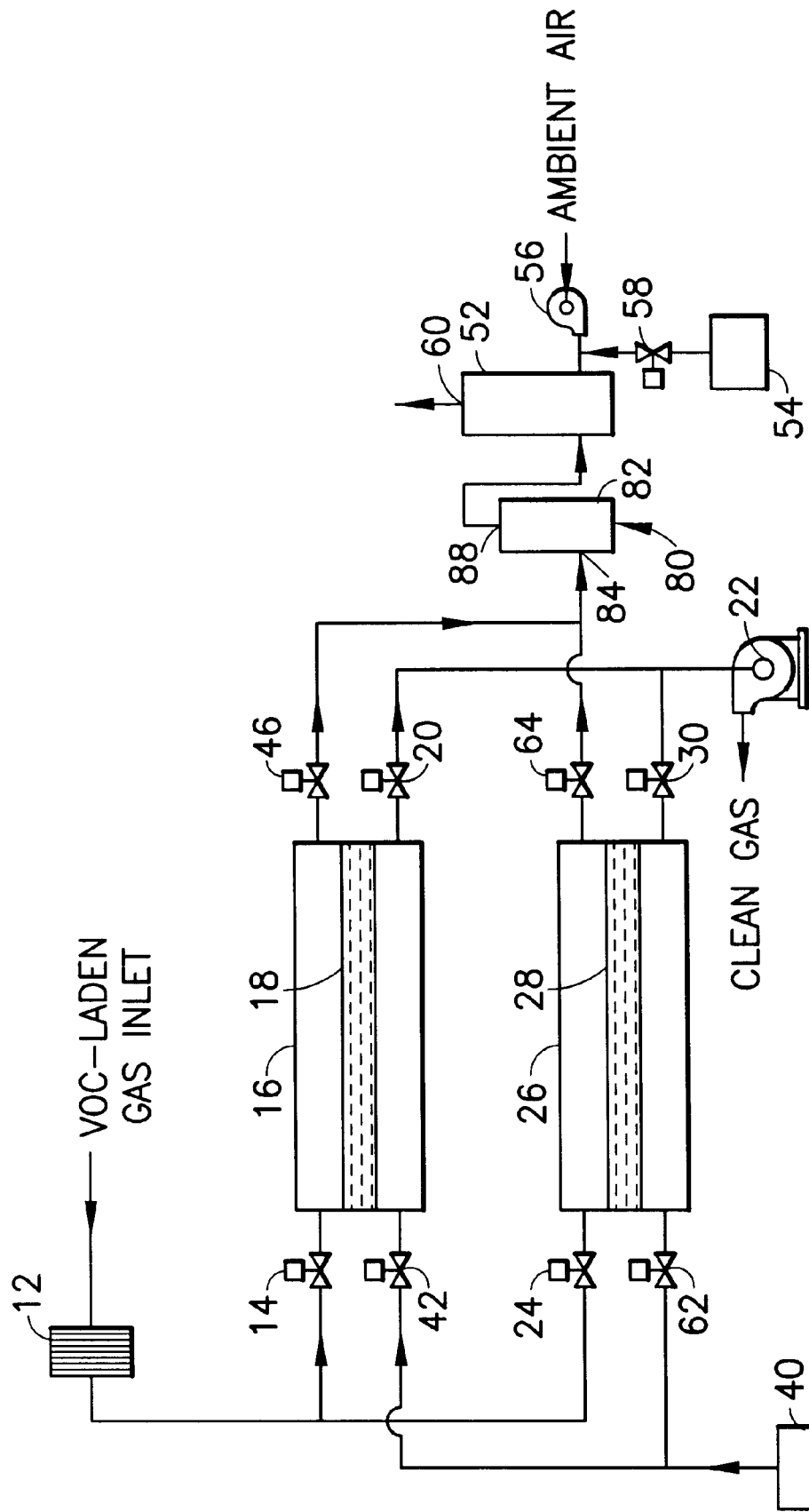
FIG. 3 is a diagrammatic illustration similar to FIG. 1 and showing an improvement in accordance with the present invention.
Figure 4:
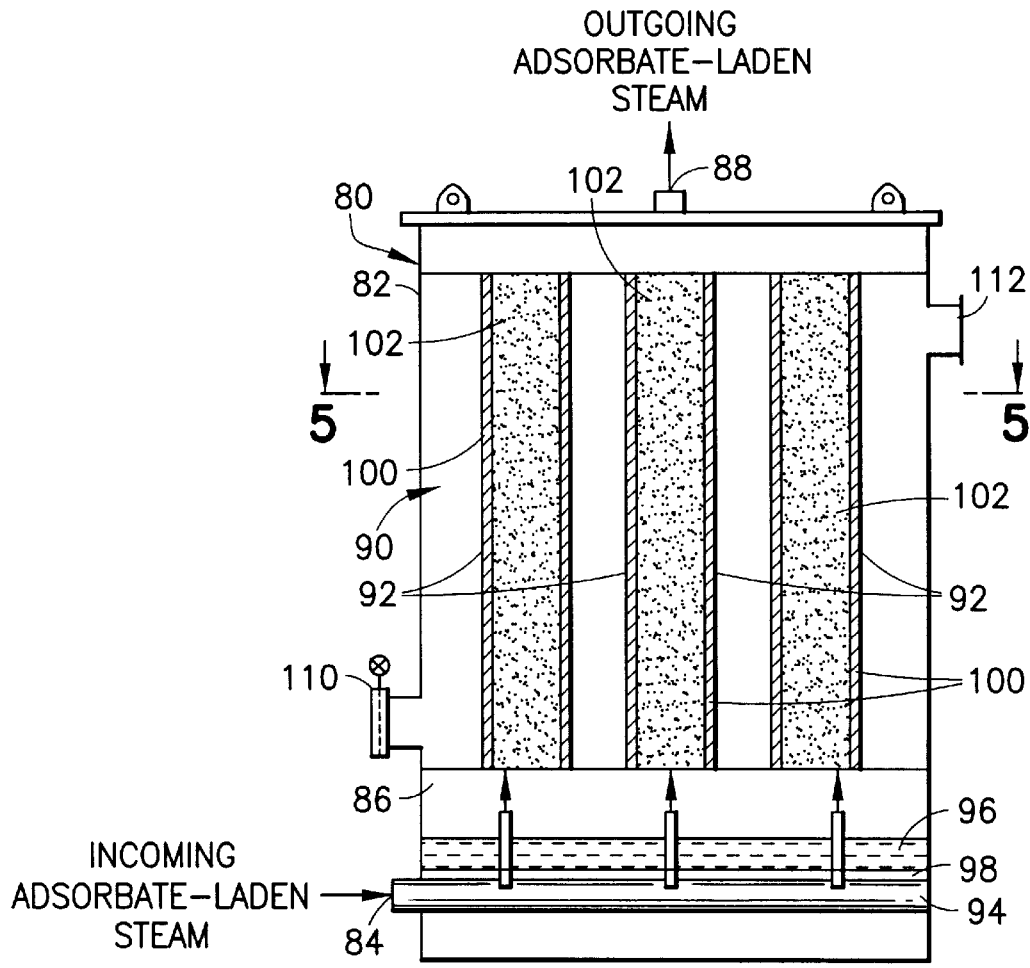
FIG. 4 is a partially diagrammatic illustration of a component of the improved system of FIG. 3.
Figure 5:
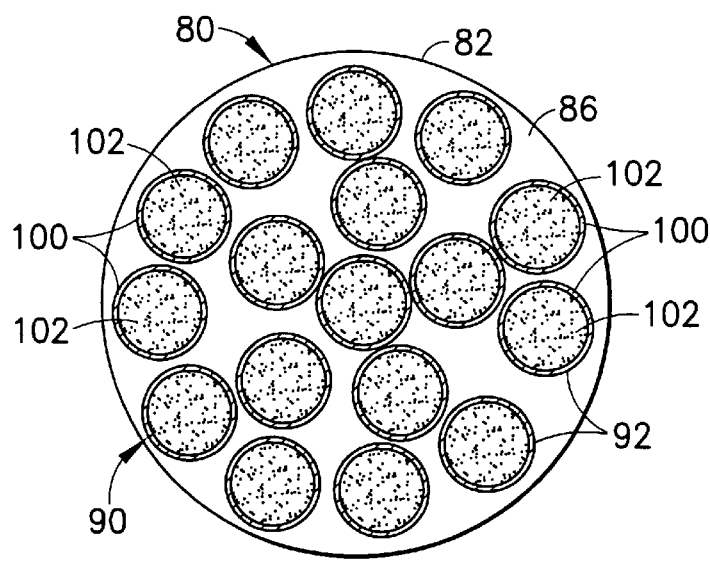
FIG. 5 is a partially diagrammatic cross-sectional view taken along line 5—5 of FIG. 4.

Referring now to FIGS. 3 through 5, a regulating apparatus constructed in accordance with the present invention is shown generally at 80 and is seen to include a chamber 82 interposed between the adsorber 16, 26 and the thermal oxidizer 52. An inlet 84 receives incoming adsorbate-laden regenerative steam and admits the adsorbate-laden steam into the interior 86 of the chamber 82, the adsorbates being VOC. An outlet 88 passes outgoing adsorbate-laden steam to the thermal oxidizer 52. A condenser 90 is located within the chamber 82, between the inlet 84 and the outlet 88, and includes condensing surfaces 92 for being contacted by incoming regenerative steam distributed to the condenser 90 by a distributor 94 so as to condense a portion of the incoming adsorbate-laden steam during at least an initial period of the regeneration cycle, during which initial period the adsorbate-laden steam admitted to the chamber 82 carries a relatively high concentration of adsorbates. By condensing a portion of the incoming adsorbate-laden steam the concentration of adsorbates in the outgoing adsorbate-laden steam is reduced. The resulting adsorbate-laden condensate 96 is collected in a condensate collection tray 98 adjacent the bottom of the chamber 82.

The condensing surfaces 92 are heated by the incoming adsorbate-laden steam so that as the regeneration cycle continues, lesser amounts of condensate 96 are formed. Further, as the regeneration cycle continues, the tray 98 serves as an evaporator for evaporating the adsorbate-laden condensate 96 to form an adsorbate-laden stream for passage through the outlet 88 and introduction into the thermal oxidizer 52. In this manner, the concentration of adsorbates introduced into the thermal oxidizer 52 throughout the duration of the regeneration cycle is regulated to avoid excessive deviations from a selected average concentration of adsorbates, thereby enabling more efficient operation of the thermal oxidizer 52 throughout the full duration of the regeneration cycle. Thus, the regulating apparatus 80 compensates for the above-described observed characteristics wherein the concentration of adsorbates in the incoming regenerative steam rises rapidly to a high peak level during the initial period of the regeneration cycle and then drops rapidly to a low level which is maintained during a subsequent period of the regeneration cycle. By condensing a portion of the incoming adsorbate-laden steam during the initial period of the regeneration cycle, the concentration of adsorbates in the outgoing adsorbate-laden steam is reduced during that initial period, while evaporation of the adsorbate-laden condensate to form the adsorbate-laden stream during the subsequent period increases the concentration of adsorbates in the outgoing adsorbate-laden steam during that subsequent period, thereby avoiding excessive deviations from the selected average concentration which enables the more effective and efficient operation of the thermal oxidizer 52 throughout the full duration of the regenerating cycle.

In order to enhance the performance of the condenser 82, the condensing surfaces 92 are located along condensing tubes 100 and a condensing medium 102 is placed within the tubes 100 for being heated by the incoming adsorbate-laden steam to control the temperature of the condensing surfaces 92 and assure that the rate of increase in the temperature of the condensing surfaces attains the desired decrease in the volume of condensate formed as the regeneration cycle continues. The preferred material for condensing medium 102 is a ceramic packing material. Further control of the temperature of the condensing surfaces 92 is attained through the selective passage of a heat exchange fluid in the form of cooling air through a damper-controlled air inlet 110 and into the chamber 82, which cooling air is passed over the condensing surfaces 92 and out of the chamber 82 through an air outlet 112, thereby serving as a regulator for regulating the temperature of the condensing surfaces 92 by the circulation of the heat exchange fluid.

Figure 6:
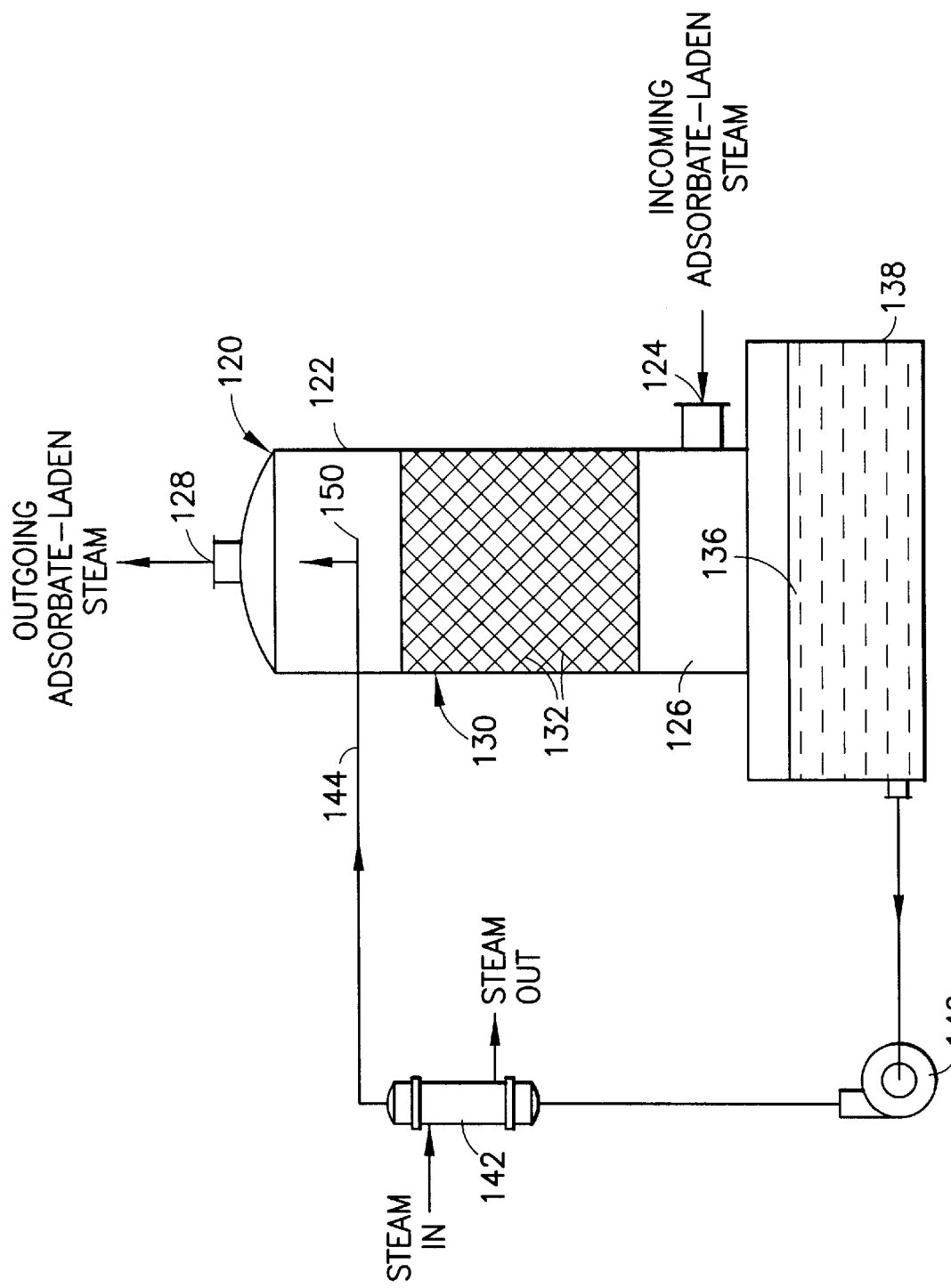
FIG. 6 is a partially diagrammatic illustration of an alternate arrangement for use in the improved system of FIG. 3.

Turning now to FIG. 6, in an alternate arrangement, another regulating apparatus constructed in accordance with the invention is shown generally at 120 and is seen to include a chamber 122 to be interposed between the adsorber 16, 26 and the thermal oxidizer 52. An inlet 124 receives incoming adsorbate-laden regenerative steam and admits the adsorbate-laden steam into the interior 126 of the chamber 122, the adsorbates being VOC. An outlet 128 passes outgoing adsorbate-laden steam to the thermal oxidizer 52. A condenser 130 is located within the chamber 122, between the inlet 124 and the outlet 128, and includes condensing surfaces 132 for being contacted by incoming regenerative steam as the steam passes through the condenser 130 so as to condense a portion of the incoming adsorbate-laden steam during at least an initial period of the regeneration cycle, during which initial period the adsorbate-laden steam admitted to the chamber 122 carries a relatively high concentration of adsorbates, thereby reducing the concentration of adsorbates in the outgoing adsorbate-laden steam. The resulting adsorbate-laden condensate 136 is collected in a condensate collection tank 138 adjacent the bottom of the chamber 122.

Adsorbate-laden condensate 136 is drawn from the collection tank 138 by a recycle pump 140 and is passed through an evaporator 142 located outside the chamber 122 to form an adsorbate-laden stream which is then passed through a conduit 144 communicating with the interior 126 of the chamber 122 at 150, to be introduced into the thermal oxidizer 52, via the outlet 128. The external evaporator 142 controls the amount of condensate 136 evaporated to form the adsorbate-laden stream, thereby attaining regulation of the concentration of the adsorbates introduced into the thermal oxidizer 52 during the subsequent period of the regeneration cycle.

In the further arrangement illustrated in FIG. 7, another regulating apparatus constructed in accordance with the invention is shown generally at 160 and is seen to include a chamber 162 to be interposed between the adsorber 16, 26 and the thermal oxidizer 52. An inlet 164 receives incoming adsorbate-laden regenerative steam and admits the adsorbate-laden steam into the interior 166 of the chamber 162, the adsorbates being VOC. An outlet 168 passes outgoing adsorbate-laden steam to the thermal oxidizer 52. A condenser 170 is located within the chamber 162, between the inlet 164 and the outlet 168, and includes condensing surfaces 172 for being contacted by incoming regenerative steam as the steam passes through the condenser 170 so as to condense a portion of the incoming adsorbate-laden steam during at least an initial period of the regeneration cycle, during which initial period the adsorbate-laden steam admitted to the chamber 162 carries a relatively high concentration of adsorbates, thereby reducing the concentration of adsorbates in the outgoing adsorbate-laden steam. The resulting adsorbate-laden condensate 176 is collected in a condensate collection tray 178 located within the chamber 162, adjacent the bottom of the chamber 162.

As in the operation described in connection with regulating apparatus 80, the condensing surfaces 172 are heated by the incoming adsorbate-laden steam so that as the regeneration cycle continues, lesser amounts of condensate 176 are formed. Further, as the regeneration cycle continues, the tray 178 serves as an evaporator for evaporating the adsorbate-laden condensate 176 to form an adsorbate-laden stream for passage through the outlet 168 and introduction into the thermal oxidizer 52. In this manner, the concentration of adsorbates introduced into the thermal oxidizer 52 throughout the duration of the regeneration cycle is regulated to avoid excessive deviations from a selected average concentration of adsorbates, thereby enabling more efficient operation of the thermal oxidizer 52 throughout the full duration of the regeneration cycle.

In order to enhance the performance of the condenser 170, a condensing medium 180 is placed within the condenser 170 for being heated by the incoming adsorbate-laden steam to control the temperature of the condensing surfaces 172 and assure that the rate of increase in the temperature of the condensing surfaces 172 attains the desired decrease in the volume of condensate formed as the regeneration cycle continues. The preferred material for condensing medium 180 is a ceramic packing material. Control of the temperature of the condensing surfaces 172 is attained through the selective circulation of a heat exchange fluid in the form of a portion of the condensate 176 which is drawn off from the tray 178 by a recycle pump 186 and passed through a regulator 190 and into the chamber 162, to be distributed by a distributor 192 to the condensing medium 180. Regulator 190 includes temperature control means in the form of a first heat exchanger 196 for cooling the condensate 176 passed through the regulator 190 and a second heat exchanger 198 for heating the condensate 176, the first and second heat exchangers 196 and 198 being available for alternate operation to accomplish either cooling or heating of the condensate 176 distributed to the condensing medium 180, as required for attaining the desired temperature at the condensing surfaces 172.

It will be seen that the present invention attains the several objects and advantages summarized above, namely: Enables a thermal oxidizer to accomplish economical destruction of adsorbates during the regeneration cycle of a carbon bed adsorber by regulating the concentration of adsorbates passed to the thermal oxidizer so as to avoid excessive deviations from an average concentration and thereby avoid the necessity for accommodating peak concentrations; permits essentially continuous economical operation of a thermal oxidizer having a capacity for accommodating an average concentration of adsorbates passed to the thermal oxidizer during a regeneration cycle, requiring minimal auxiliary fuel, as opposed to requiring a higher capacity thermal oxidizer for accommodating excessively high peak concentrations; provides increased economy in the collection and destruction of contaminants in exhaust gases emanating from industrial and commercial processes; enhances the ability of carbon bed adsorbers to be used economically for the collection and destruction of VOC in process gas streams; provides reliable and continuous removal and destruction of contaminants, such as VOC, from process exhaust gases over a relatively long service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. Apparatus for improving the operation of a thermal oxidizer during regeneration of an adsorber, wherein adsorbates collected in the adsorber are removed from the adsorber and introduced into the thermal oxidizer, by regenerative steam passed through the adsorber, to be oxidized in the thermal oxidizer during a regenerative cycle of prescribed duration, the apparatus comprising:

a chamber for interposition between the adsorber and the thermal oxidizer, the chamber including an inlet for receiving incoming adsorbate-laden steam from the adsorber, and an outlet for passing outgoing adsorbate-laden steam to the thermal oxidizer;

a condenser in the chamber between the inlet and the outlet for condensing a portion of the incoming adsorbate-laden steam during at least an initial period of the regenerative cycle to form an adsorbate-laden condensate, thereby reducing the concentration of adsorbates in the outgoing adsorbate-laden steam during at least the initial period of the regenerative cycle; and an evaporator for evaporating the adsorbate-laden condensate to form an adsorbate-laden stream for introduction into the thermal oxidizer during a subsequent period of the regenerative cycle;

wherein the concentration of adsorbates introduced into the thermal oxidizer throughout the duration of the regenerative cycle is regulated to avoid excessive deviations from a selected average concentration of adsorbates, the regulated concentration of adsorbates enabling more efficient operation of the thermal oxidizer throughout the full duration of the regenerative cycle.

2. The apparatus of claim 1 wherein the condenser includes a condensing medium for being heated by the incoming adsorbate-laden steam during at least the initial period of the regenerative cycle to reduce the amount of adsorbate-laden condensate formed as the regenerative cycle continues from the initial period to the subsequent period.

3. The apparatus of claim 2 wherein the condensing medium is a ceramic packing.

4. The apparatus of claim 1 wherein the condenser includes:

condensing surfaces upon which the adsorbate-laden condensate is formed; and a regulator for regulating the temperature of the condensing surfaces to control the amount of adsorbate-laden condensate formed on the condensing surfaces.

5. The apparatus of claim 4 wherein the regulator includes a fluid circulating system for circulating a heat exchange fluid to and from the condenser to control the temperature of the condensing surfaces.

6. The apparatus of claim 4 wherein the condenser includes a condensing medium for being heated by the incoming adsorbate-laden steam during at least the initial period of the regenerative cycle to reduce the amount of adsorbate-laden condensate formed as the regenerative cycle continues from the initial period to the subsequent period, and the regulator includes a distributor for distributing at least a portion of the adsorbate-laden condensate to the condensing medium for regulating the temperature of the condensing medium.

7. The apparatus of claim 6 wherein the regulator includes temperature regulating means for regulating the temperature of the distributed portion of the adsorbate-laden condensate.

8. The apparatus of claim 1 wherein the evaporator is located within the chamber.

9. The apparatus of claim 1 wherein the evaporator is located outside the chamber.

10. The apparatus of claim 9 wherein the evaporator includes a conduit communicating with the thermal oxidizer for conducting the adsorbate-laden stream to the thermal oxidizer.

11. A method for improving the operation of a thermal oxidizer during regeneration of an adsorber, wherein adsorbates collected in the adsorber are removed from the adsorber and introduced into the thermal oxidizer, by regenerative steam passed through the adsorber, to be oxidized in the thermal oxidizer during a regenerative cycle of prescribed duration, the method comprising:

providing a chamber for interposition between the adsorber and the thermal oxidizer;

receiving within the chamber incoming adsorbate-laden steam from the adsorber and passing outgoing adsorbate-laden steam to the thermal oxidizer;

condensing a portion of the incoming adsorbate-laden steam during at least an initial period of the regenerative cycle to form an adsorbate-laden condensate, thereby reducing the concentration of adsorbates in the outgoing adsorbate-laden steam during at least the initial period of the regenerative cycle; and evaporating the adsorbate-laden condensate to form an adsorbate-laden stream for introduction into the thermal oxidizer during a subsequent period of the regenerative cycle;

wherein the concentration of adsorbates introduced into the thermal oxidizer throughout the duration of the regenerative cycle is regulated to avoid excessive deviations from a selected average concentration of adsorbates, the regulated concentration of adsorbates enabling more efficient operation of the thermal oxidizer throughout the full duration of the regenerative cycle.

12. The method of claim 11 wherein the condensing of the portion of the incoming adsorbate-laden steam includes forming the adsorbate-laden condensate on condensing surfaces of a condenser, and the method includes regulating the temperature of the condensing surfaces to control the amount of adsorbate-laden condensate formed on the condensing surfaces.

13. The method of claim 12 including circulating a heat exchange fluid to and from the condenser to control the temperature of the condensing surfaces.

14. The method of claim 12 wherein the condenser includes a condensing medium, the method including heating the condensing medium with the incoming adsorbate-laden steam during at least the initial period of the regenerative cycle to reduce the amount of adsorbate-laden condensate formed as the regenerative cycle continues from the initial period to the subsequent period.

15. The method of claim 14 including distributing at least a portion of the adsorbate-laden condensate to the condensing medium for regulating the temperature of the condensing medium.

16. The method of claim 15 including regulating the temperature of the distributed portion of the adsorbate-laden condensate.

17. The method of claim 11 wherein the adsorbate-laden condensate is evaporated within the chamber.

18. The method of claim 11 wherein the adsorbate-laden condensate is evaporated outside the chamber.

19. The method of claim 18 wherein the adsorbate-laden stream is conducted to the thermal oxidizer.

20. the method of claim 11 wherein the adsorbates are mostly to essentially all volatile organic compounds.

* * * * *